United States Patent Office 3,707,516
Patented Dec. 26, 1972

1

3,707,516
COATING COMPOSITION OF AN ACRYLIC-EPOXY GRAFT COPOLYMER
Aloysius N. Walus, Flint, Mich., assignor to E. I. du Pont de Nemours and Company, Wilmington, Del.
No Drawing. Filed Apr. 28, 1971, Ser. No. 138,363
Int. Cl. C08g 45/08; C09d 3/52, 3/58
U.S. Cl. 260—21                              12 Claims

ABSTRACT OF THE DISCLOSURE

The novel coating composition consists essentially of a graft copolymer dissolved in an organic solvent wherein the backbone of the graft copolymer is of polymerized constituents of methyl methacrylate, acrylonitrile, styrene or mixtures thereof, and also can contain polymerized $\alpha,\beta$-unsaturated acid constituents; the copolymer has grafted into the backbone through polymerized units of $\alpha,\beta$-unsaturated carboxylic acids side chains of an epoxy ester of an epoxy resin and a drying oil and an epoxy ester of an epoxy resin, a dicarboxylic acid and an epoxy resin. The composition forms a high quality coating and is useful as a sealerless primer, as a sealer or a primer surfacer composition in the manufacture of automobiles and trucks.

BACKGROUND OF THE INVENTION

This invention relates to a coating composition, and in particular, to a high quality coating composition of an acrylic-epoxy ester graft copolymer.

Acrylic coating compositions are well known in the art and have been utilized as exterior coatings for automobiles and thucks. In particular, lacquers of methyl methacrylate as shown in Johnson, U.S. Pats. 2,782,131 and 2,782,132, both issued Feb. 19, 1957; Crissey U.S. Pat. 2,934,509, issued Apr. 26, 1960 and Parker U.S. 3,477,969, issued Nov. 11, 1969, have been utilized for this purpose. Primer compositions and sealer compositions of epoxy copolymers have been used in the automobile and truck manufacturing industry and are shown in Swanson et al. U.S. 3,272,647, issued Sept. 13, 1966 and Rohrbacher U.S. 3,509,086, issued Apr. 28, 1970. Water-soluble coatings of acrylic-epoxy ester polymers are shown in French Pat. 1,583,225, granted on Sept. 15, 1969. Coatings of polyester resins are shown in Masters et al. U.S. 3,376,271, issued Apr. 2, 1968. While the aforementioned coating compositions, primer compositions and sealer compositions are excellent for many uses, the automobile and truck manufacturing industry is in need of a primer composition that will not require a sealer coat and that has excellent mar, chip and crack resistance, outstanding corrosion resistance, and excellent adhesion to the metal substrate and provides a smooth and even surface to which the exterior acrylic coatings will adhere.

The film-forming polymer utilized in the novel coating composition of this invention has a backbone segment of polymerized acrylic monomers and a side chain segment of an epoxy ester using an $\alpha,\beta$-ethylenically unsaturated monocarboxylic acid as the coupling unit. The novel composition of this invention has the aforementioned physical properties and is useful as a sealerless primer composition.

SUMMARY OF THE INVENTION

The coating composition of this invention comprises a solution of 5–50% by weight of film-forming constituents dissolved in an organic solvent, in which the film-forming constituents consist essentially of a graft polymer that has a number average molecular weight of about 10,000–150,000 and has a polymeric backbone segment and polymeric side chain segments, and up to 25% by weight, based on the weight of the film-forming constituents, of a heat reactive condensate; wherein (1) The polymeric backbone segment of the graft copolymer comprises 10–75% by weight of the copolymer and is of polymerized monomer units which can either be an acrylonitrile, methyl methacrylate, styrene or mixtures thereof; and up to 5% by weight, based on the weight of the copolymer, of polymerized $\alpha,\beta$-ethylenically unsaturated carboxylic acid monomers;

(2) The polymeric side chain segments comprise 90–25% by weight of the copolymer and are grafted into the backbone segment through an $\alpha,\beta$-unsaturated monocarboxylic acid unit that is polymerized into the backbone and the side chain segments have the formulas:

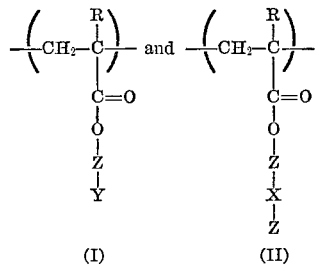

(I)            (II)

the molar ratio of the side chain segments (I) and (II) is from about 10:1 to 1:10, and wherein the side chain segments are epoxy esters where Z is the residual of epoxy hydroxy polyether resin in which the terminal epoxy groups are esterified;
Y is the residual of a drying oil fatty acid in which the carboxyl group is reacted with the terminal epoxy group of epoxy hydroxy polyether resin;
X is the residual of a dicarboxylic acid of the formula

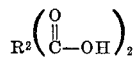

where $R^2$ is a divalent organic radical in which the carboxyl groups are reacted with the terminal epoxy groups of the epoxy hydroxy polyether resin.

DESCRIPTION OF THE INVENTION

The novel coating composition of this invention is a solution that contains preferably 15–30% by weight of film-forming constituents consisting essentially of 80–98% by weight of the graft copolymer and correspondingly, 2–20% by weight of a heat reactive condensate. Preferably, the novel coating composition is pigmented and contains about 0.1–30% by weight, based on the weight of the coating composition, of pigment. This particular composition has excellent physical properties, such as good adhesion to bare metal substrates, chip resistance, crack and mar resistance and excellent salt corrosion resistance which makes the coating particularly suitable as a sealerless primer composition for bare metals. Acrylic enamel or lacquer topcoats can be applied directly to the novel primer composition without the use of an intermediate sealer coat and the topcoat has excellent adhesion to the primer composition.

The novel coating composition is also useful as a sealer or a primer surfacer. Sealer compositions and primer surfacers are applied over a primed surface and provide a finish to which acrylic lacquer or enamel topcoats can be applied. Generally, the sealer composition is non-pigmented or only slightly pigmented while primer surfacers are highly pigment and have a pigment to binder ratio of about 2:1 to about 5:1. These primer surfacers are easily shaped by sanding or buffing. Also, the novel composition of this invention can be used as a topcoating for appliances, such as refrigerators, stoves, washers, dryers and the like.

The graft copolymer utilized in the novel coating composition of this invention is prepared by first forming epoxy ester prepolymers which are the side chain segments of the graft copolymer by using conventional polymerization techniques for the preparation of epoxy ester polymers. These prepolymers, the backbone monomer units and units of an α,β-ethylenically unsaturated monocarboxylic acid are polymerized to form the graft copolymer. The α,β-ethylenically unsaturated monocarboxylic acid reacts with the epoxy group of the prepolymers and the resulting product polymerizes with the backbone monomer units to form the graft copolymer. The monocarboxylic acid is the coupling unit which couples the epoxy ester prepolymers to the backbone of the polymer. The resulting polymer has a number average molecular weight of about 10,000–150,000 and preferably 15,000–50,000; preferably graft copolymers are utilized that comprise 30–50% by weight of backbone segment and 70–50% by weight of side chain segments and wherein the side chain segments have a molecular weight of about 2,000–20,000.

The prepolymers are prepared by conventional polymerization techniques in which an epoxy hydroxy polyether resin, a drying oil fatty acid and a dicarboxylic acid, solvents and a polymerization catalyst are blended together and heated to about 120 to 200° C. for about 1–3 hours to form epoxy ester prepolymers. The resulting prepolymers are a blend of esters of (I) an epoxy resin and the drying oil fatty acid and (II) the epoxy resin/dicarboxylic acid/epoxy resin. The molar ratio of these two epoxy esters can be from about 10:1 to about 1:10 with the preferred ratio being 2:1.

Typical solvents and diluents which are used to prepare the epoxy ester prepolymer are, for example, toluene, xylene, butyl acetate, acetone, methylisobutyl ketone, methylethyl ketone, butyl alcohol, hexane, Cellosolve, Cellosolve acetate, V M & P naphtha, mineral spirits and other aliphatic, cycloaliphatic, aromatic hydrocarbons, esters, ethers, ketones and alcohols.

About 0.1–4% by weight, based on the total weight of the monomers used to prepare the prepolymer, of a polymerization catalyst is used, such as sulfonic acid, organic tin compounds, such as butyl tin dilaurate, dibutyl tin oxide, litharge, titanium complexes, aromatic ammonium hydroxide compounds, for example, benzyltrimethylammonium hydroxide and tetramethylammonium chloride.

The epoxy hydroxy polyether resins utilized in preparing the epoxy ester prepolymers have the repeating structural formula

wherein $n$ is an integer sufficient to provide the epoxy resin with a molecular weight of at least about 500 and up to about 4,000, and preferably, epoxy resins are used that have a molecular weight of 1500–3000.

One preferred epoxy resin is the reaction product of epichlorohydrin and bisphenol A that provides a resin in which —$R^3$— is

This epoxy resin readily forms coatings which have a balance of desired physical properties, such as high tensile strength, excellent solvent resistance and excellent adhesion to substrates and to acrylic lacquers or enamel topcoats. Another very useful epoxy resin is the reaction product of epichlorohydrin and bisphenol F which provides a resin in which —$R^3$— is —$CH_2$—.

The drying oil fatty acids used to form the epoxy ester are linseed oil fatty acids, dehydrated castor oil fatty acids, tall oil fatty acids, tung oil fatty acids, soya oil fatty acids and mixtures thereof. One of the preferred drying oil fatty acids is linseed oil fatty acids. The epoxy ester of the drying oil fatty acid and the epoxy resin form the side chain segment (I) of the graft copolymer.

The dicarboxylic acid used to prepare the epoxy ester prepolymer that forms side chain segment (II) of the graft copolymer is of the general formula

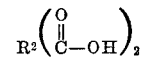

where $R^2$ is a divalent organic radical. Also, blends of dicarboxylic acids and anhydrides of dicarboxylic acids can be utilized. Typical dicarboxylic acids that can be used to prepare the polymer are, for example, aromatic dicarboxylic acids, alicyclic dicarboxylic acids, aliphatic dicarboxylic acids having 4–11 carbon atoms, dimer acids or a mixture of any of these acids and anhydrides of these acids. Typical saturated aliphatic dicarboxylic acids are succinic, glutaric, adipic, pimelic, suberic, azelaic, brassic, dodecanodoic and the like; alicyclic dicarboxy acids are, for example, hexahydroterephthalic acid, tetrahydroisophthalic acid, tetrahydrophthalic acid; typical aromatic dicarboxylic acids are isophthalic acid, terephthalic acid, orthophthalic acid, 1,5-naphthalene dicarboxylic acid, 2,2'-dibenzoic dicarboxylic acid, 2,2'-isopropylidenedibenzoic acid, 2,2'-ketodibenzoic acid, oxydibenzoic acid, 2,2'-sulfondibenzoic acid, and the like. Dimer fatty acids are the dimerization products of ethylenically unsaturated drying oil fatty acids. Typically useful dimer fatty acids are "Empol" 1014. "Empol" 1022, "Empol" 1024. One particularly useful dimer fatty acid is the dimerization product of an 18 carbon atom drying oil fatty acid. The molar ratio of the epoxy resin to the dicarboxylic acid is maintained at about 2:1 to form an epoxy ester prepolymer with reactive epoxy groups.

The graft copolymer is then prepared by adding the backbone constituents to the above epoxy ester prepolymers. The constituents can be diluted with one of the aforementioned solvents and a polymerization catalyst is added and the constituents are heated to about 75–150° C. for about 2–6 hours to form the graft copolymer.

Another method that can be used is to add the backbone monomers to the epoxy resin, drying oil fatty acid, dicarboxylic acid mixture. The aforementioned epoxy ester prepolymers will be first formed and then on the addition of the polymerization catalyst for the vinyl polymerization reaction, the backbone monomer units polymerize and form the backbone of the polymer.

About 0.1–4% by weight, based on the weight of the constituents used to prepare the graft copolymer, of a polymerization catalyst for the backbone monomers is used, such as ditertiary butyl peroxide, cumene hydroperoxide, azo-bis-isobutyronitrile.

Typical monomer units which are used to form the backbone of the graft copolymer are styrene, acrylonitrile, methyl methacrylate or mixtures thereof. Optionally, up to 5% by weight of the copolymer of units of α,β-unsaturated carboxylic acid can be used such as, acrylic acid, methacrylic acid, crotonic acid, ethacrylic acid, itaconic acid, maleic acid and the like. Acrylic acid and methacrylic acid are preferred in amounts of 0.1–5% by weight of the copolymer.

Up to 10% by weight, based on the weight of the backbone segment of the polymer, of acrylic monomers which have adhesion promoting groups, can be utilized. Typical monomers which provide adhesion promoting groups are hydroxyaminopropyl methacrylate, diethylaminoethyl methacrylate, dimethylaminoethyl methacrylate, 2-aminopropyl methacrylate, 2-aminoethyl methacrylate, t-butylaminoethyl methacrylate, 2-(1-aziridinyl)-ethyl methacrylate, n-2-hydroxypropylmethacrylamide and n-2-hydroxyethylmethacrylamide and 3 - (2 - methacryloxyethyl)-2,2-spirocyclohexyloxazolidine.

Small amounts of a plasticizer, for example, 0.1–5% by weight, based on the weight of film-forming constituents, can also be used in the novel composition, such as butyl benzyl phthalate, dibutyl phthalate, triphenyl phosphate, 2-ethylhexylbenzyl phthalate, dicyclohexyl phthalate, dibenzyl phthalate, butylcyclohexyl phthalate, mixed benzoic acid and fatty oil acid esters of pentaerythritol, poly-(propylene adipate) dibenzoate, diethylene glycol dibenzoate, tetrabutylthiodisuccinate, butyl phthalyl butyl glycolate, acetyltribuytl citrate, dibenzyl sebacate, tricresyl phosphate, toluene ethyl sulfonamide the di-2-ethylhexyl-ester of hexamethylene diphthalate, di(methylcyclohexyl) phthalate.

Other plasticizers that can be used are epoxidized soya bean oil, oil-free and oil-modified alkyd resins, and polyesters, such as polyethylene terephthalate esters, polyalkylene adipate esters, polyacrylene adipate esters, polyesters of adipic acid/neopentyl glycol/benzoic acid, coconut oil/phthalic anhydride/ethylene glycol and the like.

Pigments are used in the novel coating composition of this invention in the amounts of 0.1–30.0% by weight, and preferably, about 10–25% by weight of pigment, is used. Preferably, the pigment is formed into a mill base using conventional techniques and then blended with the composition. Examples of the great variety of pigments which are used in the novel coating composition of this invention are metallic oxides, preferably titanium dioxide, zinc oxide, and the like, metal hydroxides, metal flakes, metal powders, chromates, such as lead chromate, sulfides, sulfates, carbonates, carbon black, silica, talc, china clay, lead and iron blues, organic reds, maroons, organic dyes, lakes, etc. One preferred pigment blend of sealerless primer composition is as follows: carbon black, titanium dioxide and aluminum silicate.

Preferably, the novel coating composition of this invention contains from about 2–20% by weight, based on the weight of the film-forming constituents, of a heat reactive condensate, and more preferably, 5–18% by weight of the heat reactive condensate. Typical heat reactive condensates that are used are as follows: melamine/formaldehyde, melamine/formaldehyde that has been at least partially reacted with an aliphatic monohydric alcohol having 1–4 carbon atoms, urea/formaldehyde, benzoguanamine/formaldehyde, toluene sulfonamide and the like. In general, melamine formaldehyde resins that are methylolated and have from 3–6 methylol groups are useful in this invention. Typical resins of this type are hexamethoxy-

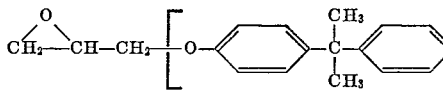

methylol melamine, melamine/formaldehyde/methanol resin wherein the molar ratio is about 1/5/3.

Benzoguanamine/formaldehyde resin is highly preferred for a sealerless primer composition, since it provides a primer coating to which acrylic lacquer and enamel topcoat will adhere.

The novel coating compositions of this invention can be applied to a variety of substrates, for example, unprimed or primed metal substrates, wood, glass, plastics, such as polypropylene, styrene, copolymers of styrene and the like, by any of the usual application methods, such as spraying, electrostatic spraying, dipping, brushing, flow coating and the like. These coatings are baked at about 110–200° C. for about 10–60 minutes. The resulting coating is about 0.5–5 mils thick, preferably 1–2 mils thick and can be buffed or sanded in accordance with conventional techniques, if desired, to improve smoothness.

One sealer composition that can be prepared from the novel coating composition of this invention contains 30–70% by weight of the graft copolymer, and correspondingly, 70–30% by weight of high molecular weight epoxy resin that has a molecular weight of about 20,000 up to 200,000 and above. The epoxy resin is of the type described herein and the preferred type is the reaction product of epichlorohydrin and bisphenol A since it forms the high quality sealer composition.

The novel coating composition of this invention has excellent adhesion to bare or treated metals or to metals which have been previously painted with alkyd or acrylic enamels. Also, in addition to its use as a sealerless primer, the novel composition can be a highly pigmented coating or can be used as a clear sealer coating. The novel composition can be used as a topcoating, for example, on appliances, such as refrigerators, stoves, or a coating for industrial machinery and the like. When used as a primer or a sealer composition, topcoats of lacquers and enamels have excellent adherence to the novel coating composition of this invention which also has excellent mar and chip and scratch resistance.

The following examples illustrate this invention. The parts and percentages are by weight unless otherwise specified.

Example 1

An epoxy ester acrylic graft copolymer is prepared as follows:

| Portion 1: | Parts by weight |
|---|---|
| "Epon" 829 Epoxy resin [1] | 573 |
| Bisphenol A | 231 |
| Ethylene glycol monobutyl ether | 440 |
| Portion 2: | |
| Ethylene glycol monobutyl ether | 40 |
| Dimer fatty acids "Empol" 1014 (the dimerization product of 18 carbon atom drying oil fatty acids) | 60 |
| Linseed oil fatty acids | 56 |
| Portion 3—Benzyltrimethyl ammonium hydroxide solution (40% solids in methanol) | 10 |
| Portion 4: | |
| Acrylic acid | 53 |
| Styrene monomer | 547 |
| Butanol | 50 |
| Portion 5: | |
| Butanol | 200 |
| Ethylene glycol monoethyl ether | 273 |
| Xylol | 780 |
| Dodecyl mercaptan | 6 |
| Portion 6—Ditertiary butyl peroxide | 10 |
| Portion 7—Ditertiary butyl peroxide | 4 |
| Total | 3333 |

[1] "Epon" 829 has the following structural formula:

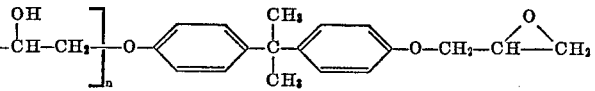

$n$ is a positive integer sufficiently large to provide a Gardner-Holdt viscosity measured on undiluted resin at 25° C. of 100–160 poises and has an epoxy equivalent of 180–195. The epoxy equivalent is the grams of resin containing 1-gram equivalent of epoxide.

Portion 1 is charged into a reaction vessel equipped with a stirrer, reflux condenser and a heating mantel and the ingredients are heated to the reflux temperature and held at this temperature for 30 minutes. Portion 2 is then slowly added to the reaction mixture over a 10-minute period and then Portion 3 is added and the reaction mixture is again heated to its reflux temperature and held at this temperature for about 45 minutes. Portion 4 is then slowly added over a 3-minute period and the reaction mixture is held at its reflux temperature for an additional 30 minutes, and then Portion 5 is slowly added over a 10-minute period. Portion 6 is added and the reaction mixture is maintained at its reflux temperature for about 2½ hours and then Portion 7 is added and the reaction mixture is held at its reflux temperature for an additional 2 hours, and then the reaction mixture is allowed to cool to room temperature.

The resulting polymer solution has a polymer solids content of 44.6% and the solution has a Gardner-Holdt viscosity measured at 25° C. of W. The polymer has an acid number of about 18.3 and a relative viscosity of 1.063 measured at 0.5% polymer solids in ethylene dichloride at 25° C.

The resulting polymer of an epoxy ester/styrene/acrylic acid in a weight ratio of 60/36.5/3.5 wherein the epoxy ester is grafted through the acrylic acid constituent to the backbone of the styrene and acrylic acid.

A mill base is prepared as follows:

| | Parts by weight |
|---|---|
| Polymer solution (prepared above) | 750 |
| Diacetone alcohol | 150 |
| Aromatic hydrocarbon solvent having a boiling point of 150–190° C. and an aniline point of −28° C. | 570 |
| Soya lecithin solution (50% solids in mineral spirits and xylene) | 30 |
| Titanium dioxide pigment | 210 |
| Carbon black pigment | 18 |
| Aluminum silicate | 1272 |
| Total | 3000 |

The above ingredients are premixed and then charged into a conventional sand mill and ground in one pass to a 0.2 mil fineness.

A sealerless primer composition is prepared as follows:

| | Parts by weight |
|---|---|
| Mill base (prepared above) | 300 |
| Polymer solution (prepared above) | 200 |
| Benzoguanamine/formaldehyde resin solution (66% solids in butanol) | 34 |
| Diacetone alcohol | 10 |
| Hydrocarbon solvent (boiling point 182–219° C.) | 50 |
| Total | 594 |

These ingredients are charged into a mixer and agitated for one hour. Then the composition is reduced to a spray viscosity using the above hydrocarbon solvent. A steel substrate is then sprayed with the composition and baked for about 45 minutes at 150° C. to provide a polymer of film about 1 mil in thickness. A coating of a standard automotive acrylic lacquer is then applied over the substrate using conventional spraying and baking procedures. The acrylic topcoat has excellent adhesion to the primer sealer coat and the composition has excellent chip resistance as measured by a gravelometer tester, excellent crack resistance and excellent resistance to weathering.

Example 2

An epoxy ester/acrylic graft copolymer is prepared as follows:

| Portion 1: | Parts by weight |
|---|---|
| Epoxy resin ("Epon" 1004) [1] | 374.6 |
| Dimer fatty acids "Empol" 1014 (described in Example 1) | 28.4 |
| Linseed oil fatty acids | 13.5 |
| Lithium ricinoleate | 0.4 |
| Benzotrimethyl ammonium hydroxide | 4.0 |
| Ethylene glycol mono-butyl ether | 224.0 |
| Portion 2: | |
| Acrylic acid | 24.5 |
| Styrene monomer | 259.0 |
| Portion 3: | |
| Butyl alcohol | 140.0 |
| Ethylene glycol mono-ethyl ether | 332.0 |
| Xylol | 351.0 |
| Dodecyl mercaptan | 3.0 |
| Portion 4—Ditertiary butyl peroxide | 5.0 |
| Portion 5—Ditertiary butyl peroxide | 2.0 |
| Total | 1761.4 |

[1] "Epon" 1004—epoxy resin having the structural formula as set forth in Example 1 and a Gardner-Holdt viscosity measured at 40% by weight solution in butyl carbitol at 25° C. of Q–U and an epoxide equivalent of 875–1025.

Portion 1 is charged into a reaction vessel equipped with a stirrer and a reflux condenser and the ingredients are stirred and heated until a solution is formed and then the reaction mixture is heated to its reflux temperature and held at this temperature until the polymer has an acid number of 3. Portion 2 is then slowly added over a 5-minute period and the reaction mixture is then heated to its reflux temperature and held at its reflux temperature of about 30 minutes. Portion 3 is then slowly added over a 10-minute period, then Portion 4 is added and the reaction mixture is heated to its reflux temperature and maintained at its reflux temperature for about 3 hours. Portion 5 is then added and the reaction mixture is maintained at its reflux temperature for an additional 1 hour and 30 minutes, then the reaction mixture is cooled to room temperature. The resulting polymer solution has a polymer solids content of about 39.3% and the solution has a Gardner-Holdt viscosity measured at 25° C. of about S. The polymer has an acid number of 19.0 and a relative viscosity of 1.073 measured at 0.5% polymer solids in ethylene dichloride at 25° C.

A mill base is then prepared as in Example 1, except the above prepared polymer solution is substituted for the polymer solution utilized in Example 1. A sealerless primer composition is then prepared as in Example 1 utilizing the above prepared mill base and the above prepared polymer solution is substituted for the polymer solution utilized in Example 1.

The resulting composition is then reduced to a spray viscosity using the hydrocarbon solvent of Example 1 and the composition is sprayed onto a steel substrate and baked for 45 minutes at about 150° C. to provide a film about 1 mil in thickness. A coating of a standard automotive acrylic lacquer is then applied over the substrate using conventional spray and baking procedures. The acrylic topcoat has an excellent appearance, excellent adhesion to the substrate and the composite has excellent chip resistance as measured by a gravelometer tester and excellent crack resistance.

What is claimed is:

1. A coating composition comprising a solution of 5–50% by weight of film-forming constituents in an organic solvent wherein the film-forming constituents consist essentially of a graft copolymer having a number average molecular weight of 10,000–150,000 and comprises 10–75% by weight of a polymeric backbone segment and 90–25% by weight of polymeric side chain segments; wherein
   (1) the polymeric backbone segment of the graft copolymer consists essentially of polymerized monomer units selected from the group consisting of acrylonitrile, methyl methacrylate, styrene and mixtures thereof; and up to 5% by weight, based on the weight of the copolymer, of polymerized α,β-ethylenically unsaturated carboxylic acid monomers; and
   (2) the polymeric side chain segments are grafted into the backbone segment and have the formulas shown as grafted into the backbone segment

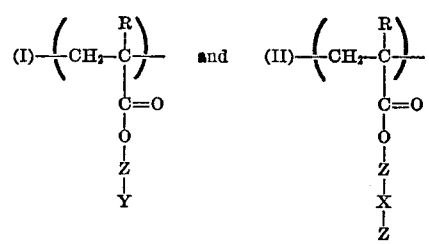

wherein

R is H or $CH_3$, the molar ratio of the side chain segments (I) and (II) is from about 10:1 to 1:10 and wherein the side chain segments are epoxy esters where Z is the residual of an epoxy hydroxy polyether resin in which the terminal epoxy groups are esterified;

Y is the residual of a drying oil fatty acid in which the carboxyl group is reacted with the epoxy hydroxy polyether resin;

X is the residual of a dicarboxylic acid of the formula $$R^2\left(\overset{O}{\underset{}{\overset{\|}{C}}}-OH\right)_2$$

wherein $R^2$ is a divalent organic radical in which the carboxyl groups are reacted with the epoxy hydroxy polyether resin.

2. The coating composition of claim 1 containing 15–30% by weight of film-forming constituents consisting essentially of 80–98% by weight of the graft copolymer, and correspondingly, 2–20% by weight of a heat reactive condensate and containing 0.1–30% by weight of pigment in which the heat reactive condensate is selected from the group consisting of melamine/formaldehyde which has been at least partially reacted with an aliphatic monohydric alcohol having 1–4 carbon atoms, urea/formaldehyde, benzoguanamine formaldehyde and toluene sulfonamide.

3. The coating composition of claim 2 in which the graft copolymer has a number average molecular weight of about 15,000 to 50,000 and the backbone segment comprises 30–50% by weight of the copolymer and the side chain segment having a molecular weight of 2,000–20,000 correspondingly comprises 70–50% by weight of the copolymer.

4. The coating composition of claim 3 in which the epoxy hydroxy polyether resin has the following recurring structural unit $$\left[-O-\underset{}{\bigcirc}-R^3-\underset{}{\bigcirc}-O-CH_2-\overset{OH}{\underset{}{\overset{|}{CH}}}-CH_2-\right]_n$$

where $n$ is a positive integer sufficiently large to provide a molecular weight of 500–4,000 and $R^3$ is an alkylene group;

the drying oil fatty acid is selected from the group consisting of linseed oil fatty acids, dehydrated castor oil fatty acids, tall oil fatty acids, tung oil fatty acids, soya oil fatty acids and mixtures thereof; and the dicarboxylic acid is selected from the group consisting of dimer fatty acids, aromatic dicarboxylic acids, alicyclic dicarboxylic acids and saturated aliphatic dicarboxylic acids having 4–11 carbon atoms.

5. The coating composition of claim 4 in which —$R^3$— is selected from the group consisting of —$CH_2$— and $$-\overset{CH_3}{\underset{CH_3}{\overset{|}{\underset{|}{C}}}}-$$

6. The coating composition of claim 5 in which the heat reactive condensate is benzoguanamine/formaldehyde.

7. The coating composition of claim 6 containing 0.1–5% by weight, based on the weight of the graft copolymer segment, of an $\alpha,\beta$-unsaturated carboxylic acid selected from the group consisting of acrylic acid, methacrylic acid, itaconic acid, ethacrylic acid, crotonic acid and maleic acid.

8. The coating composition of claim 1 comprising a solution of 15–30% of film-forming constituents in an organic solvent wherein the graft copolymer has a number average molecular weight of about 15,000–50,000 and consists essentially of a graft copolymer having (1) 30–50% by weight, based on the weight of the graft copolymer, of a backbone segment consisting essentially of styrene and 1–5% by weight, based on the weight of the copolymer of acrylic acid, and correspondingly, (2) 50–70% by weight, based on the weight of the graft copolymer, of side chain segments wherein the epoxyhydroxy polyether resin has the following recurring structural unit $$\left[-\underset{}{\bigcirc}-\overset{CH_3}{\underset{CH_3}{\overset{|}{\underset{|}{C}}}}-\underset{}{\bigcirc}-CH_2-\overset{OH}{\underset{}{\overset{|}{CH}}}-CH_2-\right]_n$$

where $n$ is a positive integer sufficiently large to provide a molecular weight of about 1500 to 3000;

the drying oil fatty acid is linseed oil fatty acid and the dicarboxylic acid is a dimer acid; and 2–20% by weight, based on the weight of the coating composition of benzoguanamine/formaldehyde resin.

9. The coating composition of claim 8 containing 10–25% by weight pigment.

10. The coating composition of claim 9 in which the pigment consists essentially of titanium dioxide, carbon black and aluminum silicate.

11. A graft copolymer consisting of 10–75% by weight of a polymeric backbone segment and correspondingly 90–75% by weight of polymeric side chain segments, wherein (1) the polymeric backbone segment of the graft copolymer consists essentially of polymerized monomer units selected from the group consisting of acrylonitrile, methyl methacrylate, styrene and mixtures thereof; and up to 5% by weight, based on the weight of the copolymer, of polymerized $\alpha,\beta$-ethylenically unsaturated carboxylic acid monomers;

(2) the polymer side chain segments are grafted into the backbone segment and have the formulas shown as grafted into the backbone segment $$-\left(CH_2-\overset{R}{\underset{}{\overset{|}{C}}}\right)- \quad \text{and} \quad -\left(CH_2-\overset{R}{\underset{}{\overset{|}{C}}}\right)-$$
$$\begin{array}{cc} \overset{|}{C}=O & \overset{|}{C}=O \\ \overset{|}{O} & \overset{|}{O} \\ \overset{|}{Z} & \overset{|}{Z} \\ \overset{|}{Y} & \overset{|}{X} \\ & \overset{|}{Z} \end{array}$$

(I)        (II)

wherein

R is H or $CH_3$, the molar ratio of the side chain segments (I) and (II) is from about 10:1 to 1:10 and wherein the side chain segments are epoxy esters where Z is the residual of an epoxy hydroxy polyether resin in which the terminal epoxy groups are esterified;

Y is the residual of a drying oil fatty acid in which the carboxyl group is reacted with the epoxy hydroxy polyether resin;

X is the residual of a dicarboxylic acid of the formula $$R^2\left(\overset{O}{\underset{}{\overset{\|}{C}}}-OH\right)_2$$

where $R^2$ is a divalent organic radical in which the carboxyl groups are reacted with the epoxy hydroxy polyether resin.

12. The graft copolymer of claim 11 in which the polymeric backbone consists essentially of styrene and 1-5% by weight, based on the weight of the copolymer, of acrylic acid.

References Cited
UNITED STATES PATENTS

| | | | |
|---|---|---|---|
| 3,378,601 | 4/1968 | Tanaka et al. | 260—837 |
| 3,196,120 | 7/1965 | McLaughlin et al. | 260—23 |
| 3,272,647 | 9/1966 | Swanson et al. | 117—75 |
| 3,376,271 | 4/1968 | Masters et al. | 260—78.4 |
| 3,509,086 | 4/1970 | Rohrbacher | 260—32.8 |

FOREIGN PATENTS

| | | | |
|---|---|---|---|
| 1,583,225 | 10/1969 | France | 260—834 |
| 1,227,008 | 3/1971 | Great Britain | 260—834 |

DONALD E. CZAJA, Primary Examiner

R. W. GRIFFIN, Assistant Examiner

U.S. Cl. X.R.

117—75, 132 BE, 161 LN, 161 ZB; 260—18 EP, 32.2 EP, 33.4 EP, 33.6 EP, 834, 836, 837